United States Patent
Dardenne et al.

(10) Patent No.: US 9,312,916 B2
(45) Date of Patent: Apr. 12, 2016

(54) METHOD AND DEVICE FOR TESTING SUBSCRIBER PREMISES EQUIPMENT

(71) Applicant: Alcatel Lucent, Boulogne-Billancourt (FR)

(72) Inventors: Xavier Dardenne, Antwerp (BE); Benoît Drooghaag, Namur (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/418,225

(22) PCT Filed: Jul. 24, 2013

(86) PCT No.: PCT/EP2013/065650
§ 371 (c)(1),
(2) Date: Jan. 29, 2015

(87) PCT Pub. No.: WO2014/044442
PCT Pub. Date: Mar. 27, 2014

(65) Prior Publication Data
US 2015/0195006 A1      Jul. 9, 2015

(30) Foreign Application Priority Data

Sep. 24, 2012   (EP) .................................... 12306150

(51) Int. Cl.
*H04M 1/24* (2006.01)
*H04M 3/08* (2006.01)
(Continued)

(52) U.S. Cl.
CPC ................. *H04B 3/48* (2013.01); *H04M 3/306* (2013.01); *H04M 11/062* (2013.01); *H04M 11/066* (2013.01)

(58) Field of Classification Search
CPC .............. H04L 1/20; H04L 1/24; H04B 3/46; H04B 17/0042; H04B 17/004; H04M 3/30; H04M 3/301; H04M 1/24; H04M 3/2209; H04M 3/2254; H04M 3/2227; H04M 3/28; H04M 3/26

USPC ......... 375/219, 222, 224, 257, 259, 260, 295, 375/316, 346, 354, 358, 377; 379/1.01, 379/1.03, 1.04, 22–24, 27.01, 27.03–27.04, 379/28, 29.01–29.02, 29.09

See application file for complete search history.

(56) References Cited

U.S. PATENT DOCUMENTS

| 2005/0058115 A1 | 3/2005 | Levin et al. |
| 2007/0053304 A1 | 3/2007 | Defoort |

(Continued)

FOREIGN PATENT DOCUMENTS

| EP | 1079578 A2 | 2/2001 |
| EP | 1414180 A2 | 4/2004 |

(Continued)

OTHER PUBLICATIONS

International Search Report PCT/ISA/210 for International Application No. PCT/EP2013/065650, mailed on Dec. 10, 2013.

(Continued)

*Primary Examiner* — James M Perez
(74) *Attorney, Agent, or Firm* — Harness, Dickey & Pierce, P.L.C.

(57) ABSTRACT

In one embodiment, the method includes determining at least one value that depends on an attenuation of a signal transmitted over a telecommunication line to a DSL modem or received over the telecommunication line from the DSL modem; detecting depending on the value that the DSL modem is coupled with the telecommunication line via a DSL splitter in such a way that the DSL modem is connected to a different connector of the DSL splitter than a modem connector of the DSL splitter, which modem connector is intended for being connected with the DSL modem; determining a loop length value of the telecommunication line; and determining a threshold depending on the loop length value, wherein the detecting is based on comparing the threshold with the value.

13 Claims, 8 Drawing Sheets

(51) Int. Cl.
*H04M 3/22* (2006.01)
*H04B 3/48* (2015.01)
*H04M 3/30* (2006.01)
*H04M 11/06* (2006.01)

(56) References Cited

U.S. PATENT DOCUMENTS

| | | |
|---|---|---|
| 2008/0101448 A1 | 5/2008 | Meleis et al. |
| 2008/0292064 A1 | 11/2008 | Wu et al. |
| 2009/0323903 A1* | 12/2009 | Cioffi .................. H04B 1/1027 379/32.01 |
| 2010/0142601 A1 | 6/2010 | Flowers et al. |
| 2014/0036979 A1* | 2/2014 | Belge ............................ 375/225 |
| 2014/0098705 A1* | 4/2014 | Chow .................. H04L 12/2898 370/254 |

FOREIGN PATENT DOCUMENTS

| | | |
|---|---|---|
| EP | 1761012 A1 | 3/2007 |
| EP | 2216972 A1 | 8/2010 |
| WO | WO-2008051394 A2 | 5/2008 |
| WO | WO-2008073327 A2 | 6/2008 |
| WO | WO-2012091725 A1 | 7/2012 |

OTHER PUBLICATIONS

Written Opinion of the International Searching Authority PCT/ISA/237 for International Application No. PCT/EP2013/065650, mailed on Dec. 10, 2013.

* cited by examiner

METHOD AND DEVICE FOR TESTING SUBSCRIBER PREMISES EQUIPMENT

FIELD OF THE INVENTION

The present invention refers to a method for testing customer premises equipment comprising a Digital Subscriber Line (DSL) modem coupled with a telecommunication line. The present invention further refers to such a device for testing customer premises equipment, a respective monitoring station and to a respective computer program product, such as a storage medium containing a computer program for executing such a method.

BACKGROUND

Electrical telecommunication subscriber lines are often used for both classical narrowband services such as Plain Old Telephone Service (POTS) or Integrated Services Digital Network (ISDN) access, as well as for access to broadband services like Internet access or internet protocol television (IPTV). The broadband access is usually referred to as Digital Subscriber Line (DSL). In order to operate the classical narrowband services and the DSL service simultaneously on the same subscriber line, these two types of service use different frequency ranges on the telecommunication line. A low frequency range is used for the narrowband services, e.g. POTS or ISDN, and a higher frequency range above said low frequency range is used for DSL.

Accordingly, Customer Premises Equipment (CPE) typically includes a splitter to connect terminal equipment or network termination equipment for both the narrowband services and the broadband services to the single telecommunication line. The splitter includes a low-pass filter arranged for preventing high-frequency DSL signals from propagating to terminal or network termination equipment used for the classical narrowband services. The low-pass filter protects the DSL signals against high frequency disturbances that could be caused by terminal and network termination equipment of the narrowband services, in particular by analogue telephones. Furthermore, the low-pass filter prevents DSL signals from propagating to the terminal or network termination equipment for the narrowband services, in particular to an analogue telephone, and thus avoids e.g. audible noise during telephone communications.

It may happen that customers erroneously connect DSL devices, in particular DSL modems, to a connector of the splitter that is intended to be connected with narrowband terminal or network termination equipment (e.g. analogue telephone or ISDN network termination). In case that the narrowband service is POTS, there is the risk that the phone would be connected to a connector of the splitter intended to be connected to the DSL modem (modem connector) while the DSL modem would be connected to a connector of the splitter intended to be connected to the phone. In such a case of erroneous interconnection of the parts of the CPE, the DSL signal, which lies entirely within the stop-band of the low-pass filter of the splitter, would be strongly attenuated when reaching the DSL modem. As a consequence, the performance of the DSL service would be significantly degraded, and in many cases, the DSL modem could not even be able to synchronize with an access node (e.g. a DSL Access Multiplexer, DSLAM) of the network operator.

Known test methods for testing the telecommunication line between the network operator and the subscriber, such as Metallic Line Testing (MELT) or Single Ended Line Test (SELT), generally involved in DSL connectivity troubleshooting, would not show any physical fault on the telecommunication line. Hence, costly and time consuming investigations are often needed to identify the problem.

SUMMARY

Thus, the object of the present invention is to provide a device and method that allows to detect an incorrectly connected splitter without requiring any manual intervention from the service provider.

According to an embodiment, a method for testing subscriber premises equipment comprising a DSL modem coupled with a telecommunication line of a telecommunication network is provided, wherein the method comprises determining at least one value that depends on an attenuation of a signal transmitted over the telecommunication line to the DSL modem or received over the telecommunication line from the DSL modem; and detecting depending on the value that the DSL modem is coupled with the telecommunication line via a DSL splitter in such a way that the DSL modem is connected to a different connector of the DSL splitter than a modem connector of the DSL splitter, which modem connector is intended for being connected with the DSL modem. Said interconnection of parts of the customer premises equipment where the DSL modem is connected to said different connector, i.e. to the wrong connector, is also referred to as "incorrectly connected splitter" or "reversed splitter". By considering the value that characterizes the attenuation, the incorrect interconnection of the DSL modem and the DSL splitter may be rather reliably detected because—due to a low-pass filter of the splitter—the attenuation is much higher when the modem is connected to a different connector than the modem connector compared to the case where the modem is connected to the modem connector.

In an embodiment, the method comprises determining a loop length value that depends on a loop length of the telecommunication line said detecting depends on the determined loop length value. The loop length dependent detecting improves the reliability of the method. The loop length is the length of the telecommunication line. In an embodiment, the loop value may therefore correspond to that length expressed in a length unit, e.g. in meters. In another embodiment, the loop length value may be expressed e.g. as an electrical loop length, i.e. a loop length dependent attenuation of the line. The loop length value, may be determined e.g. by SELT measurements on the line or by querying a database e.g. of a network operator, which database includes data about the loop length.

In an embodiment, the method comprises determining a threshold depending on the loop length and wherein the detecting is based on comparing the threshold with the value. In one embodiment, the threshold may be predefined or acquired by manual user input. In another embodiment, the threshold is calculated by means of simulating the line. Preferably, simulating the line may cover a simulation scenario where the modem is connected to the modem port and a different simulation scenario where the modem is connected to a different port of the splitter than the modem port.

In an embodiment, the method comprises concluding that the DSL modem is connected correctly to the line, e.g. to the modem connector or directly to a customer side end of the telecommunication line; concluding that the DSL modem is connected to a further connector of the DSL modem; and/or concluding that a reliable decision on whether the DSL modem is connected to the modem connector or to the further connector is not possible. The further connector may be any connector of the splitter different than the modem connector, e.g. a connector for a POTS terminal or ISDN terminal equipment such as a telephone, a fax machine, a narrowband modem, etc.

Preferably, the concluding depends on comparing the value with a first threshold and a second threshold. By comparing the value with two thresholds, the case where a reliable conclusion is not possible can be easily identified.

According to an embodiment, the value corresponds to a loop attenuation of the telecommunication line. In this embodiment, the respective threshold(s) may be a loop attenuation threshold that may be compared with a measured loop attenuation value. The loop attenuation value and the corresponding threshold may be determined for the signal transmitted over the telecommunication line to the modem (downstream signal) and/or for the signal received over the telecommunication line from the modem (upstream signal). Determining the value for both the downstream and the upstream signal would improve the reliability of the method.

In another embodiment, the value corresponds to a received signal power of a signal including at least one activation tone, the at least one activation tone being sent by the DSL modem over the telecommunication line. In an embodiment, the received signal power is the signal power of a network side end of the telecommunication line, which is opposite to the customer side end of the line to which the modem is connected. In this embodiment, the received signal power may be measured by an access node (e.g. a DSLAM) connected to the network side end of the telecommunication line. The higher is the attenuation the lower is the received signal power. Thus, the received signal power is a value that depends on the attenuation. Preferably, the received signal power corresponds to the signal power of the signal including the at least one activation tone received, e.g. by an access node, at an end of the telecommunication line opposite to an end of that line to which end the modem is connected.

In an embodiment, the method comprises determining the value for at least two different frequencies of the signal, preferably the frequencies of two subsequent activation tones, and the detecting the reversed splitter may depend on the value corresponding to the at least two different frequencies.

In an embodiment, method comprises testing whether a rate at which the signal power decreases with the frequency of the signal is higher than a predefined rate threshold and concluding that the DSL modem is connected to the further connector if the testing shows that the rate is higher than the rate threshold. In an exemplary embodiment, a difference of the measured signal power of two subsequent activation tones may be calculated and compared with one or two signal power difference thresholds in order to conclude on whether or not the splitter is connected correctly, or on whether a reliable conclusion based on said signal power difference is not possible. In this exemplary embodiment, the rate threshold corresponds to the at least one power difference threshold. The higher is the rate, the higher is the difference of the measured signal power of the two subsequent activation tones.

In an embodiment, the method comprises testing whether the signal power increases with the frequency of the signal and concluding that the signal is a result of crosstalk from a further telecommunication line if the testing shows that the signal power increases with the frequency.

In a preferred embodiment, the method comprises determining whether the DSL modem is synchronized with an access node, preferably a DSLAM, and wherein the concluding on whether the DSL modem is connected to the modem connector of the DSL splitter is based on the signal power of the activation tone if the modem is not synchronized and wherein said concluding is based on the loop attenuation if the modem is synchronized. In other words, the at least one value may be the signal power or the loop attenuation. Preferably, either the signal power or the loop attenuation is used as the value that depends on the attenuation, depending on whether or not the modem and the access node are synchronized with each other.

According to another embodiment a device for testing customer premises equipment is provided, the subscriber premises equipment comprising a DSL modem coupled with a telecommunication line of a telecommunication network, wherein the device is operable for determining at least one value that depends on an attenuation of a signal transmitted over the telecommunication line to the DSL modem or received over the telecommunication line from the DSL modem; and detecting depending on the value that the DSL modem is coupled with the telecommunication line via a DSL splitter in such a way that the DSL modem is connected to a different connector of the DSL splitter than a modem connector of the DSL splitter, which modem connector is intended for being connected with the DSL modem.

In an embodiment, the device is arranged, preferably programmed, for executing a method according to the invention, embodiments of which method are herein described. The device may comprise a controller or a computer programmed for executing a method according to the invention, embodiments of which method are herein described.

According to yet another embodiment, a monitoring node comprising a communication interface (e.g. wire line interface such as an Ethernet interface or a wireless interface, etc) for connecting the monitoring node to a network including subscriber premises equipment is provided, the subscriber premises equipment comprising a DSL modem, wherein the monitoring node comprises the above-mentioned device for testing subscriber premises equipment. In an embodiment, the monitoring node may comprise a computer, such as a desktop computer or server computer corresponding e.g. to the Personal Computer (PC) architecture, which computer may include the communication interface, e.g. an Ethernet interface or the like.

According to still another embodiment, a computer program product, preferably a computer readable storage medium, is provided, comprising a computer program, which computer program is programmed for executing a method according to the invention, embodiments of which method are herein described, when run on a computer. The storage medium may comprise magnetic storage (e.g. magnetic discs or tapes), optical storage (e.g. optical discs) or semiconductor storage (e.g. RAM, ROM or Flash memory).

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
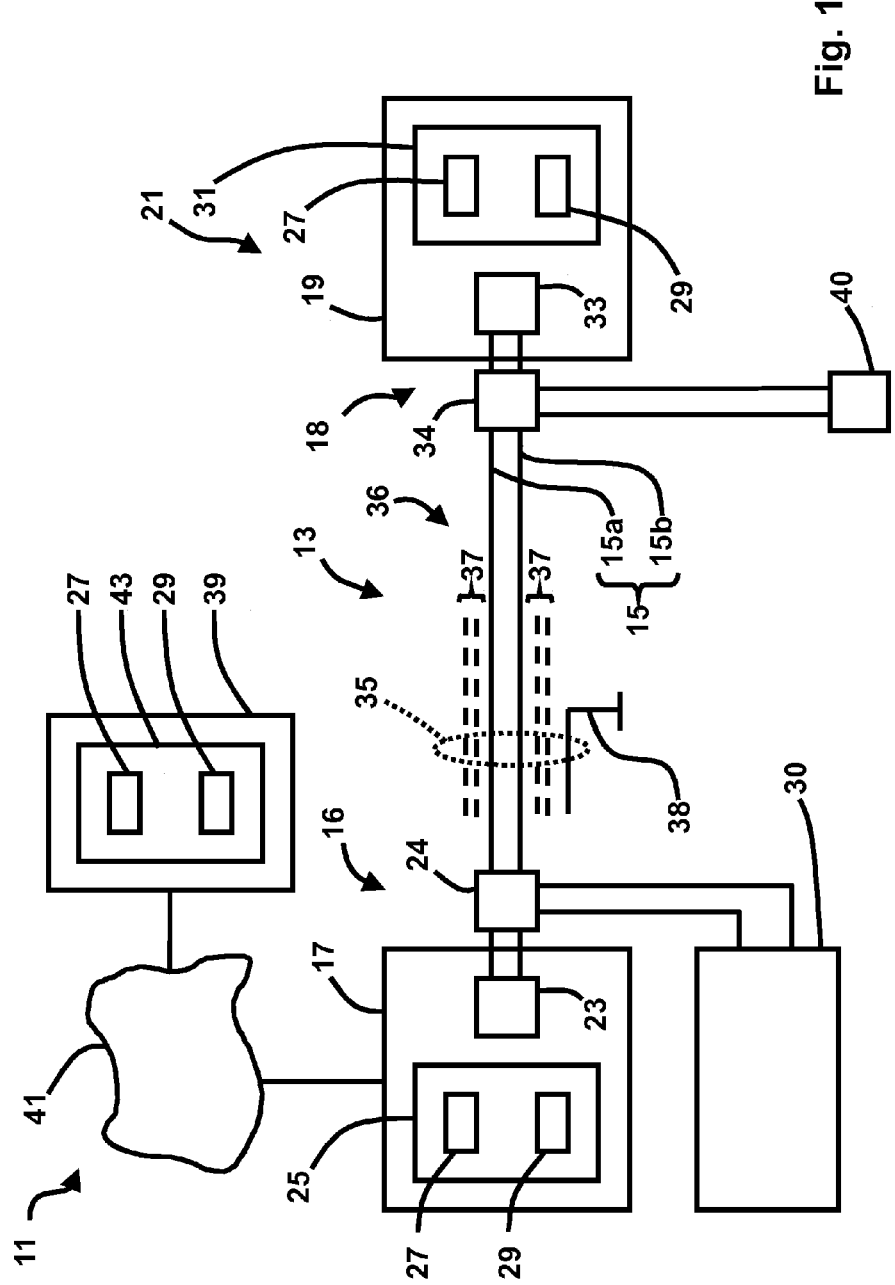
FIG. 1 shows a communication network.

FIG. 1 shows a communication network 11 comprising a telecommunication line 13. The telecommunication line 13 has a pair 15 of electrical conductors 15a, 15b with a first end 16 of the pair 15 being connected to a network side termination node of the network 11, further referred to as access node 17, and a second end 18 of the pair 15 being connected to a terminal side termination node 19 of the network 11. The terminal side termination node 19 may be part of customer premises equipment (CPE 21) of the network 11.

In the shown embodiment, the telecommunication line 13 is a Digital Subscriber Line (DSL), such as an ADSL, a VDSL or the like. Consequently, the access node 17 may be a DSL Access Multiplexer (DSLAM) or another type of DSL access node. The terminal side termination node 19 may be a DSL modem or include a DSL modem. However, the present invention is not limited to DSL. In another embodiment, the network 11 comprises a different type of telecommunication line 13.

The access node 17 has first modem circuitry 23 to which the first end 16 of the pair 15 is connected via a network side splitter 24. In addition, the access node 17 has a first controller 25 adapted for controlling the operation of the access node 17. In an embodiment, the first controller 25 is a programmable computer comprising a processor 27, e.g. a microprocessor, and a storage element 29, e.g. semiconductor memory. Furthermore, the network 11 may include a network element for classical narrowband services such as a telephone network switch 30. The telephone network switch 30 may comprise interface circuitry (e.g. a line card) arranged for connecting with a POTS terminal (e.g. analogue phone or fax, etc.) or for connecting with ISDN network termination equipment. The interface circuitry of the telephone network switch 30 is connected to the network side splitter 24. As a consequence, both the first modem circuitry 23 and the network element 30 are coupled with the telecommunication line 13.

The terminal side termination node 19 includes second modem circuitry 33 to which the second end 18 of the pair 15 is connected via a splitter 34 of the CPE 21. The splitter 34 is also referred to as "POTS splitter" or "DSL splitter". Customer side narrowband terminal or narrowband network termination equipment 40 of the CPE 21 is connected to the splitter 34 too. The narrowband terminal or network termination equipment 40 may include ISDN network termination equipment or POTS terminals like telephones or fax machines. Thus, the second modem circuitry 33 and the narrowband terminal or network termination equipment 40 are coupled with the telecommunication line 13.

Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least a part of the pair 15 is part of a binder 35 and extends in parallel to at least one further telecommunication line 36. Each further line 36 comprises a further conductor pair 37. The binder 35 may comprise an electrically conductive, preferably metallic, shielding 38 that may be grounded as depicted in FIG. 1.

Furthermore, the network 11 may comprise an optional monitoring station 39 connected e.g. via a interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server, a personal computer, a handheld computer such as a PDA or cell phone, etc.

At least one of the controllers 25, 31, or 43 is arranged for executing a method for testing subscriber premises equipment comprising the splitter 34 and the terminal side termination node 19 such as a DSL modem. To this end, a computer program may be provided that is programmed such that at least one of the controllers 25, 31, 43 executes the method when running said computer program. In other words, the method may be executed on the access node 17, on the station 39, or the terminal side termination node 19. The computer program may be stored on at least one storage element 29. In addition, the computer program may be stored on any type of data storage media such as magnetic or optical disk or semiconductor storage media. Furthermore, the program can be provided by a server for transmission over a network, preferably the Internet.

Figure 2:
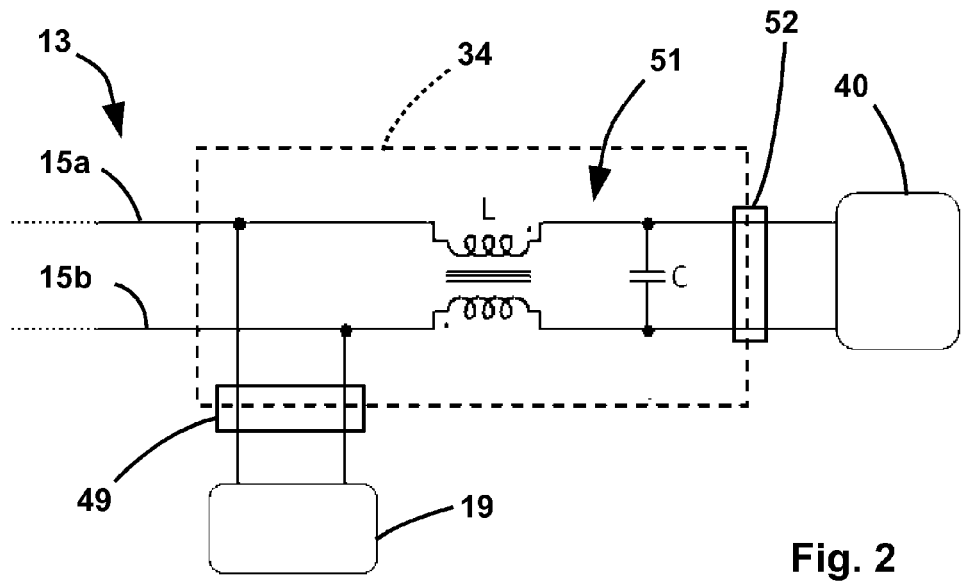
FIG. 2 shows a schematic diagram of a splitter of the network shown in FIG. 1.

FIG. 2 shows the splitter 34 in more detail. The splitter 34 connects the telecommunication line 13 directly with the terminal side termination node 19 by means of a modem connector 49. In the shown embodiment, the terminal side termination node 19 is a DSL modem. Thus, for the sake of simplicity, the terminal side termination node 19 is further also referred to as "modem 19". The splitter 34 has a second order LC low-pass filter 51 including an inductor L and a capacitor C. The low-pass filter 51 is arranged between the telecommunication line 13 and the narrowband terminal or narrowband network termination equipment 40. The narrowband terminal or network termination equipment 40 is connected to the low-pass filter 51 by means of a further connector 52. In the shown embodiment, the modem connector 49 and/or the further connector 52 are operable by the user of the CPE 21, e.g. a customer of the network operator of the network 11. It may happen that the customer connects the modem 19 not to the modem connector 49 but to a different connector resulting in an incorrect connection of the splitter 34. This incorrect connection of the splitter 34 to the modem 19 is further referred to as "reversed splitter". Typically, the customer not only connects the modem 49 with the incorrect connector 52 but also connects the narrowband terminal or network termination equipment 40 to the modem connector 49. Thus a "reversed splitter" connection includes the case where the two connectors 49, 52 are interchanged with each other. In case of a reversed splitter, the modem 19 is coupled with the telecommunication line 13 via the filter 51 of the splitter 34, i.e. the filter 51 is arranged between the customer side end 18 of the telecommunication line 13 and the modem 19. Otherwise—i.e. if the splitter is correctly connected or if the CPE 21 does not include the splitter—the modem 19 is coupled with the telecommunication line 13 directly (as shown in FIG. 2) or by means of coupling circuitry (not shown) different to the filter 51.

Figure 3:
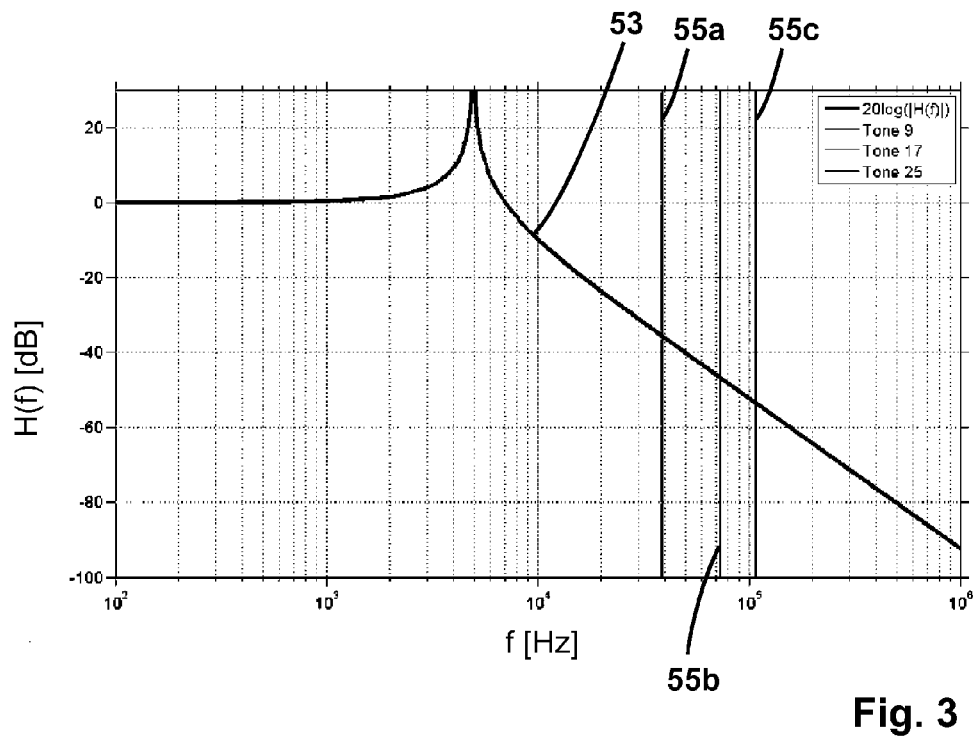
FIG. 3 shows a diagram of a transfer function of a low-pass filter of the splitter shown in FIG. 2.

FIG. 3 shows a transfer function 53 of the low-pass filter 51. In the diagram shown in FIG. 3, the frequencies of three activation tones (tone 9, tone 17 and tone 25) are shown. The activation tones are transmitted by the second modem circuitry 33 after powering up the modem 19 and before the DSL modem 19 has synchronized with the access node 17. The frequency of these activation tones are labeled with 55a, 55b and 55c, respectively. The transmission of the activation tones 55a, 55b, 55c is a part of a handshake procedure performed at the first phase of initialization of a DSL connection between the first modem circuitry 23 and the second modem circuitry 33. The second modem circuitry 33 typically transmits these activation tones 55a, 55b, 55c and listens for a response transmitted by the first modem circuitry 23 of the access node 17. For ADSL and ADSL2/2+, the activation tones have a pre-defined frequency defined in the ITU-T recommendation G994.1. They correspond to tones 9, 17 and 25, respectively. The whole DSL spectrum is divided in a number of tones, each of which is associated to a sub-carrier located at a frequency corresponding to a tone index multiplied by a 4.3125 kHz. Hence, for ADSLx, the activation tones have the frequencies 38.3125 kHz, 73.3135 kHz and 107.8125 kHz, respectively. In FIG. 3, tone 9 is labeled with 55a, tone 17 is labeled with 55b and tone 25 is labeled with 55c.

Figure 4:
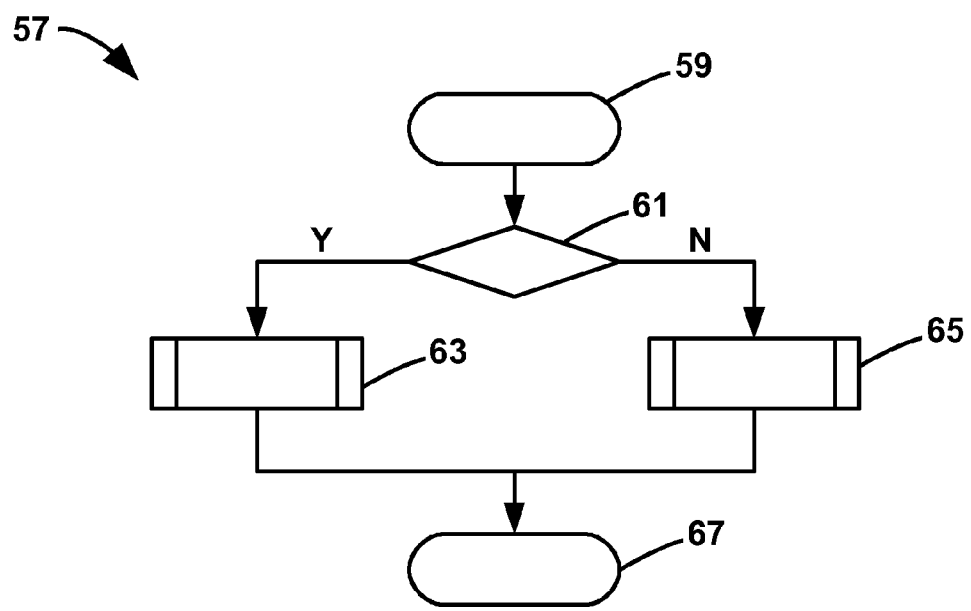
FIG. 4 shows a flowchart of a method for testing subscriber premise equipment shown in FIG. 1.
Figure 5:
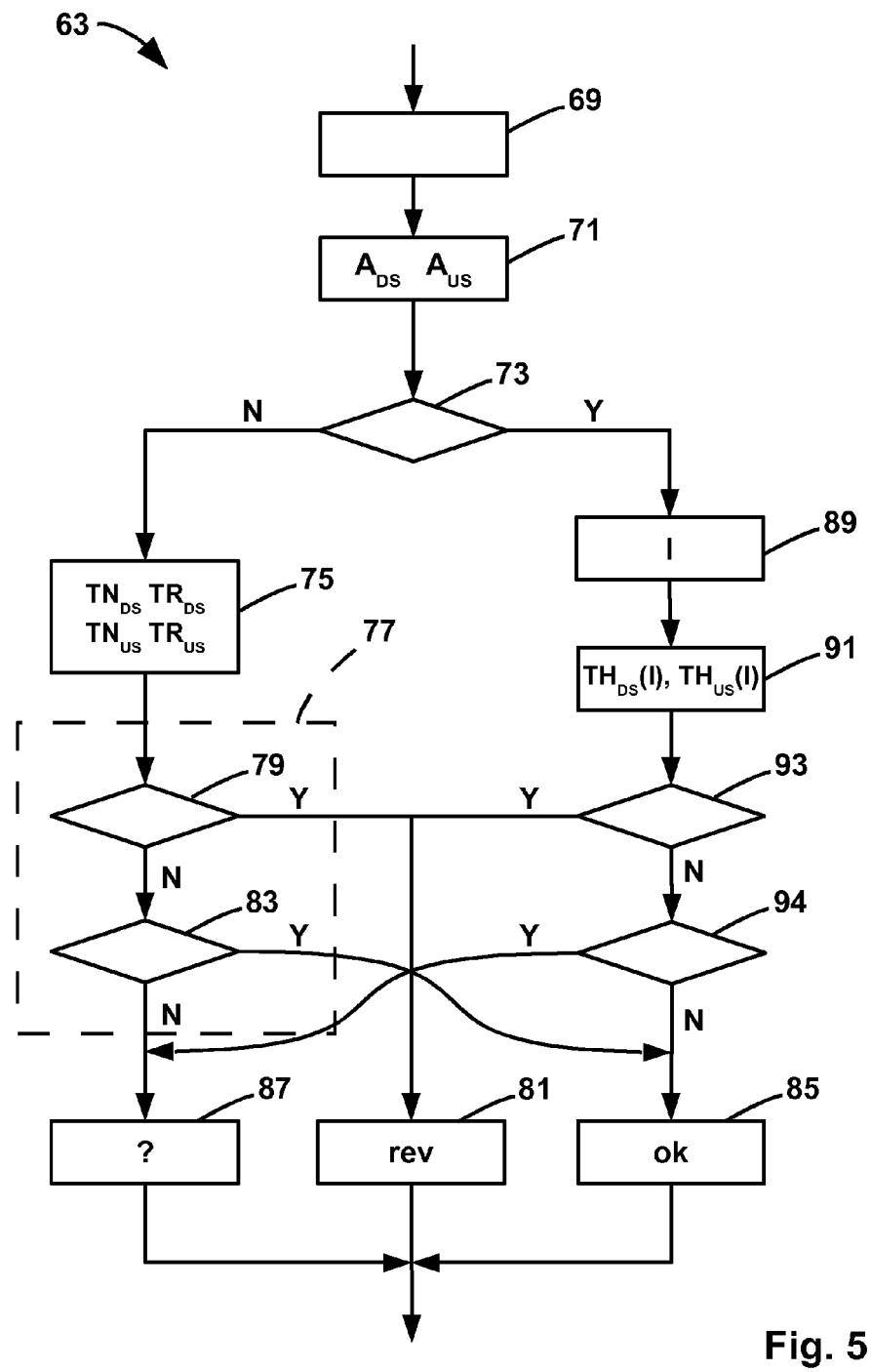
FIG. 5 shows a detail of a flowchart of FIG. 4.

FIG. 4 gives an overview on a method 57 for testing the CPE 21 for the presence of a reversed splitter 34. After a start 59 of the method 57, a branch 61 of the method 57 checks whether the modem 19 has synchronized with the access node 17. If the branch 61 concludes that the modem 19 and the access node 17 are synchronized with each other (Y), then a block 63 of the method is executed. Block 63 determines depending on a loop attenuation of the telecommunication line 13 whether the modem 19 is connected to the modem connector 49 or to a different connector of the splitter 34 such as the further connector 52, i.e. whether or not the splitter 34 is reversed. Details of the block 63 are shown in FIG. 5 and will be described below.

If step 61 concludes that the modem 19 and the access node 19 are not synchronized with each other (N) then a further block 65 of the method 57 is executed. Block 65 decides depending on a signal power of at least one activation tone 55a, 55b, 55c sent by the DSL modem 19 on whether or not the splitter 34 is reversed. Block 65 is shown in detail in FIG. 10 and will be described below. After block 63 or block 65 has been completed, the method 57 is terminated in a step 67.

In the shown embodiment, the method 57 decides automatically in step 61 whether block 63 or block 65 have to be executed. In another embodiment, the method 57 does not include the branch 61, and the decision of whether to execute block 63 or block 65 has to be performed manually. In another embodiment, the method 57 includes the block 63 but not the branch 61 and not the block 65. In yet another embodiment, the method 57 includes the block 65 but not the branch 61 and not the block 63. In the latter two embodiments, the method 57 may test the subscriber premises equipment 21 based on the loop attenuation only or based on the signal power of the at least one activation tone 55a, 55b, 55c only, respectively.

If the modem 19 is synchronized with the access node 17 although it is connected to the wrong connector 52 of the splitter 34, this wrong connection can be detected depending on a downstream loop attenuation $A_{DS}$ of the telecommunication line 13 and/or an upstream loop attenuation $A_{US}$ of the line 13. This loop attenuation $A_{SS}$, $A_{US}$ may be continuously measured by the two modem circuitries 23, 33 located in the access node 17 or modem 19, respectively. The loop attenuations $A_{SS}$, $A_{US}$ correspond to the average signal attenuation observed in the downstream and upstream bands, respectively. Because the whole spectrum used for DSL transmissions between the modem circuitries 23, 33 lies within a stop-band of the low-pass filter 51 of the splitter 34, DSL signals will be strongly attenuated by the splitter 34 if the modem 19 is connected to a different connector than the modem connector 41, in particular to the further connector 52. As a consequence, the loop attenuations will be at a much higher level than what should be observed if the splitter 34 was correctly connected.

Figure 6:
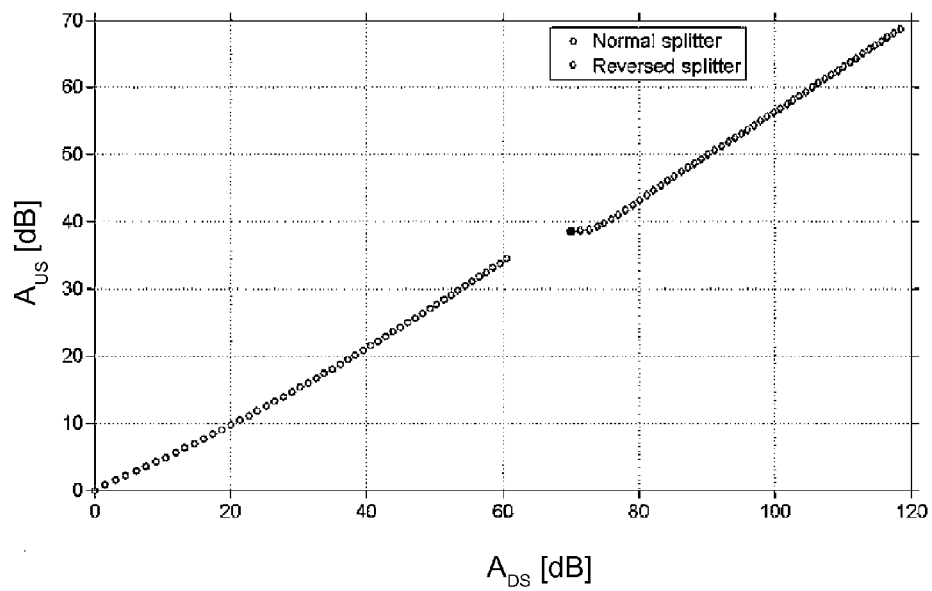
FIGS. 6 and 7 show diagrams with an upstream and downstream loop attenuation of a telecommunication line of the network shown in FIG. 1 for different cable types and different loop lengths, ranging from 0 m to 5000 m.
Figure 7:
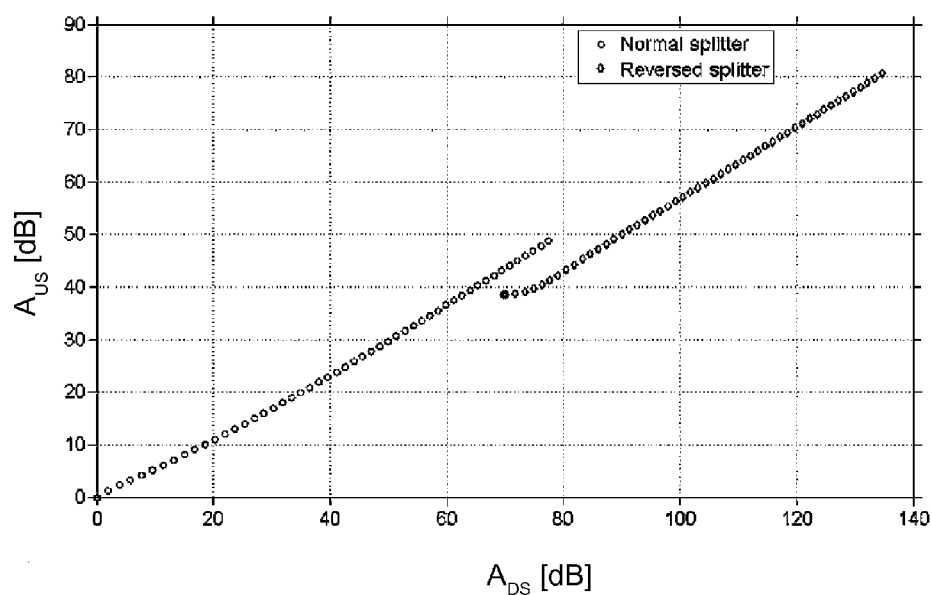

In FIGS. 6 and 7, the upstream (US) loop attenuation $A_{US}$ is plotted versus the downstream (DS) loop attenuation $A_{DS}$ for a loop length, i.e. a length of the telecommunication line 13, ranging from 0 to 5000 meters. The circles show that plot for the case where the splitter 34 is correctly connected (plot on the left of FIGS. 6 and 7). The diamond shaped plot on the right of FIGS. 6 and 7 refers to the case where the splitter 34 is reversed. In FIG. 6, the attenuations are plotted for a 24 AWG cable. FIG. 7 shows the same plots as FIG. 6. However, in FIG. 7 a 26 AWG cable is considered.

In the scenario shown in FIG. 6, the case where the splitter 34 is correctly connected with the modem 19 or not, can be detected by comparing the signal attenuation values with a threshold. However, in the scenario shown in FIG. 7, this determination cannot be unambiguously made because it may happen that normal attenuations that would be observed on long loops 13 with the splitter 34 correctly connected could be higher than the attenuations that would be observed on a short loop 13 with an incorrectly installed splitter 34. This ambiguousness may be resolved by considering not only the loop attenuation but also an estimated loop length, as will be described in detail below.

As shown in FIG. 5, the block 63 includes a step 69 that simulates the downstream and upstream loop attenuation for all possible cable types on a possible loop length range. In an embodiment, the possible cable types and the possible loop length range includes all cable types and loop length ranges that may be present in any network 11. In another embodiment, the possible cable type and loop length range is limited to those cable types and loop lengths present in the network 11 of a certain operator or used in a certain geographical region. The cable-type includes the gauge—expressed e.g. as an American Wire Gauge (AWG) value—of the cable. For example, the cable may be a 24 AWG cable or a 26 AWG cable. The loop length may start with at least almost 0 and end with the maximum possible loop length that may be several thousands of meters, e.g. 5000 m. For the simulation in step 69, a mathematical cable model may be applied. Parameters of the cable model may include the cable length and cable type parameters such as the gauge of the cable. In an embodiment, the cable model may be a standard transmission line model. Parameters of the standard cable model (e.g. a distributed resistance R', a distributed inductance L', a distributed capacitance C' or a distributed conductance G') may be set according to properties of the cable such as the cable gauge. Results of the simulations of step 69 may comprise an attenuation of a cable of a certain type and with a certain loop length.

A step 71 of block 63 collects the downstream loop attenuation $A_{DS}$ and/or the upstream loop attenuation $A_{US}$ from the modem 19 and/or the access node 17. In particular, if the method 57 is executed on the monitoring station 39, suitable communication protocols such as the SNMP may be used to retrieve the attenuation values $A_{SS}$, $A_{US}$ from the access node 17 or the modem 19.

After the simulation results of step 69 are available and step 71 has collected the attenuation values $A_{DS}$, $A_{US}$, a branch 73 checks whether or not information regarding the loop length is available or can be generated.

If no loop length information is available or can be generated (N), then a step 75 of block 63 is executed that calculates two thresholds, further referred to as normal threshold TN and reversed threshold TR. Preferably, these thresholds are calculated for the downstream (DS) and upstream (US) direction separately, resulting in four values $TN_{DS}$, $TR_{DS}$, $TN_{US}$, $TR_{US}$ of the thresholds.

Then a step 77 decides on whether or not the splitter 34 is reversed or whether a reliable decision on whether splitter 34 is reversed is not possible.

Figure 8:
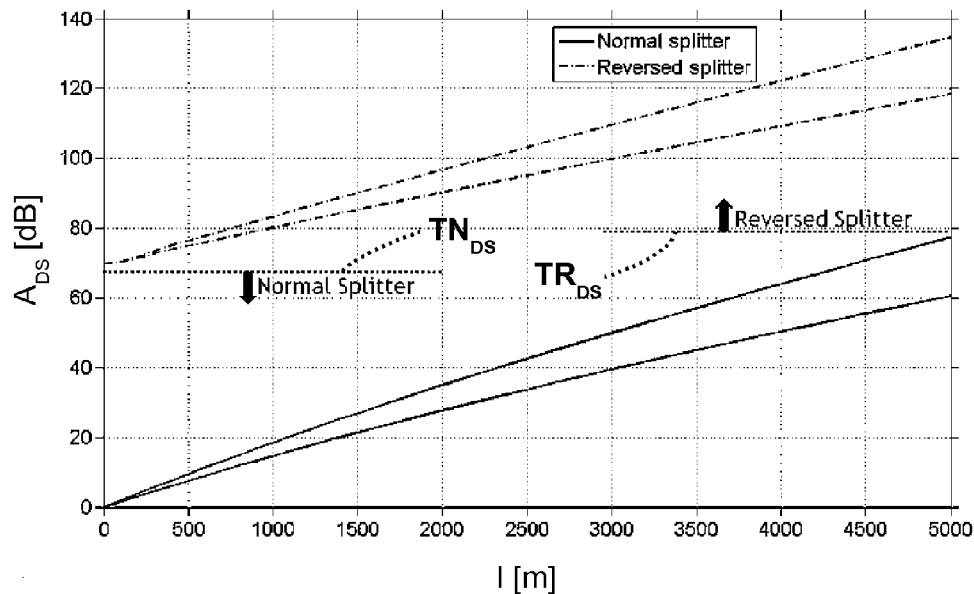
FIG. 8 shows a diagram with downstream attenuation curves of the telecommunication lines with different cable types and thresholds.

FIG. 8 illustrates how to compute the two thresholds $TN_{DS}$, $TR_{DS}$ in downstream direction depending on the simulation results calculated in step 69. The simulation results are depicted in the form of the downstream loop attenuation $A_{DS}$ in dB depending on the loop length l in m. In the example shown in FIG. 8, two possible cable types and a loop length range from 0 to 5000 meters are considered. The two continuous lines show the downstream loop attenuation $A_{DS}$ for two different cable types in case that the splitter 34 is connected correctly. The dash and dot lines show the downstream attenuation in case of the reversed splitter 34 that is in case that the modem 19 is connected to the further connector 52 of the splitter. In an embodiment, the normal threshold $TN_{DS}$ is calculated as the minimum of the simulated downstream attenuation $A_{DS}$ of all possible cable types and on the whole possible loop length range in case of a reverse splitter (minimum of all dot and dash lines of FIG. 8).

The reversed threshold $TR_{DS}$ may be calculated as the maximum of the downstream attenuation $A_{DS}$ for all possible cable types on the whole possible loop length range (maximum of all continuous lines in FIG. 8). In the shown example, the so obtained normal threshold is about $TN_{DS}$=70 dB and reverse threshold is about $TR_{DS}$=80 dB.

When considering a downstream attenuation $A_{DS}$ measured for a particular line 13, in an embodiment, the block 63 may conclude that the splitter 34 is correctly installed if the measured attenuation $A_{DS}$ is less than the normal threshold determined for the downstream direction, $A_{DS}<TN_{DS}$. If the measured attenuation $A_{DS}$ is greater than the reversed threshold determined for the downstream direction, $A_{DS}>TR_{DS}$ then block 63 may conclude that there is a reversed splitter 34. If the measured value is between these thresholds $TN_{DS}$, $TR_{DS}$ then no reliable conclusion is possible and the method may conclude that it is not possible to determine whether there is a reversed splitter or not.

FIG. 8 illustrates the calculation of the thresholds $TN_{DS}$, $TR_{DS}$ for the downstream direction. However, these thresholds can also be calculated in the upstream direction by analyzing corresponding upstream simulations. The resulting thresholds are referred to as $TN_{US}$, $TR_{US}$. In an embodiment, block 63 compares a measured upstream attenuation value $A_{US}$ with the two thresholds $TN_{US}$, $TR_{US}$ in the manner described above in connection with the downstream direction.

The embodiment shown in FIG. 5 uses both downstream and upstream measured signal attenuation values $A_{DS}$, $A_{US}$ and the corresponding values of the threshold $TN_{DS}$, $TR_{DS}$, $TN_{US}$, $TR_{US}$ determined by analyzing the simulating results as described above in connection with FIG. 8. In particular a branch 79 within step 77 checks if at least one attenuation $A_{DS}$, $A_{US}$ is above the respective reversed threshold $TR_{DS}$, $TR_{US}$ and if no attenuation value $A_{DS}$, $A_{US}$ is below the respective normal threshold $TN_{DS}$, $TN_{US}$. If branch 79 concludes that this condition is fulfilled (Y), then a step 81 of block 63 is executed that determines that a reversed splitter 34 has been detected for a particular telecommunication line 13. After step 81, the block 63 is terminated.

If the condition of branch 79 is not true (N) then a further branch 83 is executed within step 77. Branch 83 verifies whether at least one measured attenuation value $A_{SS}$, $A_{US}$ is below the corresponding normal threshold $TN_{DS}$, $TN_{DS}$ and no measured attenuation $A_{DS}$, $A_{US}$ is above the corresponding reversed threshold $TR_{DS}$, $TR_{US}$. If so (Y), block 63 executes a step 85 that determines that a correctly connected splitter 34 has been detected for a particular telecommunication line 13 or that the modem 19 is connected directly to the line 13 without using a splitter. Otherwise (N), a step 87 is executed that determines that a reliable conclusion on whether the splitter 34 is correctly connected or reversed is not possible. The block 63 terminates after step 81, 85 or step 87.

Block 77 allows to conclude on whether the splitter 34 is installed correctly or reversed based on a value $A_{DS}$, $A_{US}$ that depends on the attenuation of the telecommunication line 13 only. However, if step 73 detects that a loop length l is available or could be determined then the detection of the reverse splitter 34 is also based on the loop length l. To this end, a step 89 is executed in order to determine the loop length l. The loop length l may be determined by any suitable way. For example, the loop length l may be estimated by means of SELT or MELT measurement procedures or by a lookup in a loop length database that may be maintained by an operator of the network 11.

Figure 9:
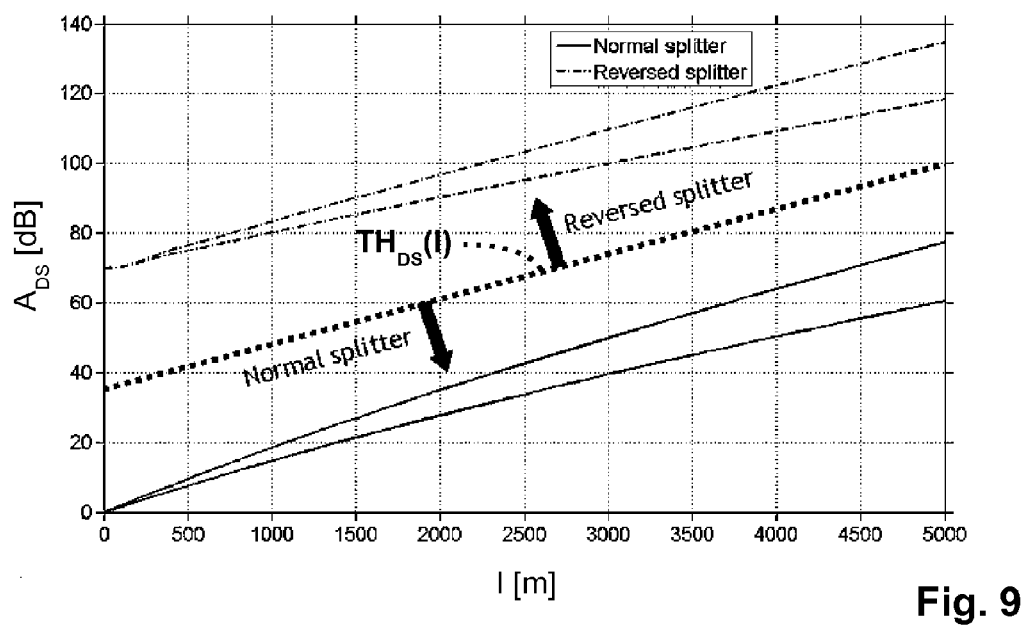
FIG. 9 shows a diagram similar to FIG. 8, with a threshold depending on the length of the telecommunication line.

A step 91 of block 63 calculates a threshold $TH_{DS}(l)$ for the downstream direction and a threshold $TH_{US}(l)$ for the upstream direction by analyzing the simulation results obtained in step 69. The threshold $TH_{DS}(l)$ depends on the loop length l. FIG. 9 illustrates the calculation of this threshold $TH_{DS}(l)$ for the same exemplary scenario as in FIG. 8 in downstream direction. Thus, the simulation results presented by the attenuation curves (dot and dash line and continuous lines) correspond to the simulation results shown in FIG. 8. However, the threshold $TH_{DS}(l)$ is a function of the loop length l. In the shown embodiment, the threshold $TH_{DS}(l)$ is determined such that it is greater than the highest attenuation value $A_{DS}(l)$ for every cable type and less than the lowest attenuation value $A_{DS}(l)$ for every cable type. This determination of the threshold is performed for each possible loop length l in order to obtain the loop length dependent threshold $TH_{DS}(l)$. In particular, the threshold $TH_{DS}(l)$ may be calculated such that it resides at least essentially in the middle between said minimum and maximum attenuation value, as shown in FIG. 9 by means of a dotted line. In the shown embodiment, step 91 calculates the loop length dependent threshold $TH_{DS}(l)$ for the downstream direction and the upstream direction separately and therefore obtains two loop length dependent thresholds $TH_{DS}(l)$, $TH_{US}(l)$.

After step 91 has calculated the thresholds $TH_{DS}(l)$, $TH_{US}(l)$, a branch 93 checks whether both measured attenuations $A_{SS}$, $A_{US}$ are above the respective threshold $TH_{DS}(l)$, $TH_{US}(l)$ for the loop length l determined in step 89. If so (Y), step 81 is executed in order to detect a reversed splitter 34. Otherwise (N), a further branch 94 checks if both measured attenuations $A_{SS}$, $A_{US}$ are below the respective thresholds $TH_{DS}(l)$, $TH_{US}(l)$. If so (Y), step 85 is executed in order to determine that the splitter 34 is connected correctly or that the modem 19 is connected to the line 13 directly without using the splitter 34. Otherwise (N), a reliable conclusion on whether or not there is a reversed splitter 34 is not possible and step 87 is executed.

Although the shown embodiment relies on the loop length dependent threshold $TH_{DS}(l)$, $TH_{US}(l)$ calculated for both the upstream as well as the downstream direction, in different embodiments, the downstream direction or the upstream direction is considered only.

Figure 10:
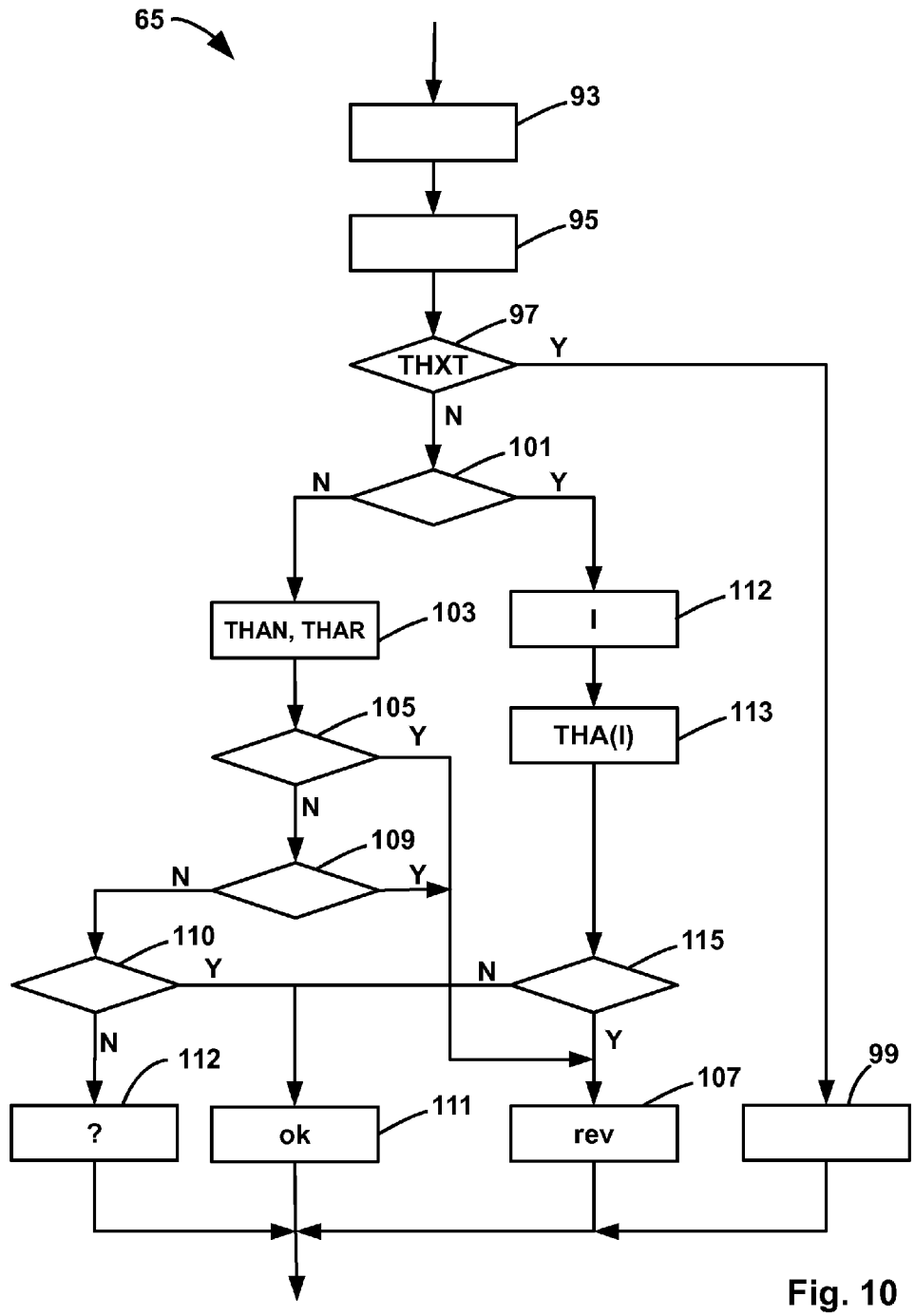
FIG. 10 shows a further detail of the flowchart of FIG. 4.

FIG. 10 shows the block 65 in more detail. Block 65 may be executed when the modem 19 is not synchronized with the access node 17. In this case, the loop attenuation $A_{DS}$, $A_{US}$ cannot be obtained. Thus, at least one different value that depends on the attenuation of the telecommunication line 13, e.g. a received signal power P of at least one activation tone 55a, 55b, 55c received by a first modem circuitry 23 of the access node 17, is used to decide on whether the splitter 34 is connected correctly to the modem 19 or reversed. A step 93 of block 65 simulates the received power P at the first modem circuitry 23 of the access node 17 for each activation tone, for all possible cable types and for the whole possible loop length range. The simulations are performed for both direct transmissions over the telecommunication line 13 and for crosstalk of the activation tones from the at least one further telecommunication line 36 to the telecommunication line 13. As described above in connection with step 69, the set of possible cable types and the possible loop length range may be determined such that they cover all possibly existing networks 11 or that they cover a network 11 of a certain network operator or the networks 11 present in certain geographical region. As in step 69, a mathematical cable model such as the above-mentioned standard transmission line model may be applied in order to perform said simulations. The crosstalk from the further line 36 may be simulated using the FEXT model described below.

Figure 11:
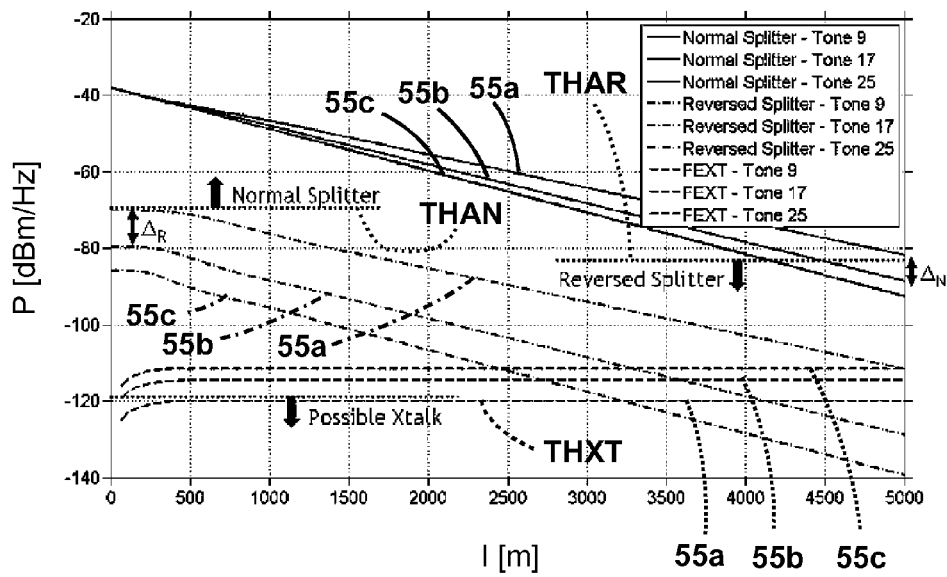
FIG. 11 shows a diagram with received signal power of different activation tones sent by a DSL modem of the network in different situations: direct transmission from the DSL modem through a correctly installed splitter, direct transmission through an incorrect connected splitter and transmission via crosstalk from a neighboring telecommunication line and thresholds.

FIG. 11 shows simulation results generated by step 93. For the sake of simplicity, only one cable type is depicted in FIG. 11. Curves of the received power level P related to tone 9, tone 17, tone 25 are labeled with the reference signs 55a, 55b, 55c, respectively. The continuous lines correspond to the case where the splitter 34 is connected correctly; the dot and dash lines are related to the case where the splitter 34 is reversed. The dashed lines are related to the case where the received signal is caused by the crosstalk from the further telecommunication line 36. The simulation results shown in FIG. 11 are based on the assumption that the modem 19 transmits the activation tones 55a, 55b, 55c with the maximum power allowed by the DSL standards of −38 dBm/Hz. It can be seen, that it is not possible to reliably determine whether the splitter 34 is connected correctly or reversed if the received power is in the range between about −70 and −90 dBm/Hz because the power level P of a rather long line 13 with correctly installed splitter 34 may be equal to or smaller than the power level P of a short line 13 with a reversed splitter 34. In addition, it is not possible to distinguish the activation tones received from a long line 13 with reversed splitter 34 from the activation tones received via crosstalk from the further telecommunication line 36 by using a single threshold only.

A step 95 of block 65 determines the received power level P at the access node 17 for each activation tone 55a, 55b, 55c. To this end, in an embodiment, a SELT could be performed during which the quiet line noise (QLN) is measured while the modem 19 is transmitting the activation tones 55a, 55b, 55c. Consequently the measured QLN includes the signal power of the activation tones received at the access node 17. During the measurement of the QLN, the activation tones 55a, 55b, 55c sent by the modem 19 may be detected and their power level P may be measured.

Then a branch 97 is executed to check whether the activation tones 55a, 55b, 55c are received via crosstalk from the further line 36. To this end, a crosstalk threshold THXT is calculated, preferably depending on the simulation results generated in step 93. In an embodiment, the crosstalk threshold THXT is chosen as the maximum of the received power of the corresponding activation tone 55a, 55b, 55c received via crosstalk, i.e. the maximum of the dashed line shown in FIG. 11. In FIG. 11, the crosstalk threshold THXT is depicted for the activation tone 9 (dashed curve 55a). The crosstalk threshold THXT is calculated for the other activation tones 17 and 25 accordingly (dashed curves 55b and 55c). Branch 97 checks whether the received power level of all three activation tones is below their corresponding crosstalk threshold THXT and the received power P increases with the index of the activation tone, i.e. with the frequency of the activation tone. If so (Y), then the block 65 detects in a step 99 that the tones are received via crosstalk from the further line 36. Otherwise (N) there is the possibility that the splitter 34 is reversed and a further branch 101 is executed.

The crosstalk from the further line 36 to the telecommunication line 13 may be modeled, in particular simulated, by using the 99% worst case far-end crosstalk (FEXT) model that can be found in the standard ANSI T1.417. According to this model, the crosstalk can be described according the following crosstalk transfer function:

$$F(f)=10-\log_{10}(7.74 \cdot 10^{21} \cdot Ndist^{0.6} \cdot Lcoup \cdot f^2)+H\log(f) \quad (1)$$

In the above equation, Ndist represents the number of disturbers (number of further lines 36). Lcoup represents the coupling length and H log represents the transfer function of the line 13 between the interfering transmitter insertion point and the access node 17. Assuming only one disturber, the crosstalk transfer function F(f) depends on the frequency, the cable type (via H log) and the coupling length Lcoup. The dependence on Lcoup is not monotonic. Indeed, on one hand, the transfer function increases with coupling length Lcoup via the term $10 \cdot \log_{10}(Lcoup)$, that is the longer the coupling length the more energy is transferred via crosstalk. But on the other hand, the crosstalk transfer function F(f) decreases with coupling length via the term $H\log(f)$ (signals transferred farther away are more attenuated). Thus, for a given tone, there will be a coupling length for which the crosstalk transfer function is at maximum. This maximum value of the crosstalk transfer function is considered as the "worst case" coupling length, which, in the shown embodiment, may be used for the simulations performed in step 93. The crosstalk transfer function F(f) increases with the square of the frequency f, as can be seen in equation (1), but the attenuation of the tones coupled by a cross talk only increases with the square root of the frequency, i.e. the tone index. As a consequence, the power level of the activation tones 55a, 55b, 55c received via crosstalk from the further telecommunication line 36 increases with frequency, i.e. the tone index. Thus, the criteria according to which the received signal power increases with the tone index may be used to decide on whether or not the activation tones 55*a*, 55*b*, 55*c* are received via crosstalk.

Branch 101 determines whether the loop length l is available or can be determined. If branch 101 concludes that the loop length l is not available and cannot be determined (N) then a step 103 is executed. Step 103 calculates a normal threshold THAN and a reversed threshold THAR from the simulation results obtained in step 93. The thresholds THAN and THAR are calculated for each activation tone 55*a*, 55*b*, 55*c* separately. In FIG. 11, exemplary values of these threshold THAN, THAR are depicted for the activation tone 55*a* having the tone index 9.

The normal splitter threshold THAN may be calculated as the maximum possible received power P for any possible cable type and any possible loop length, assuming that the splitter 34 is reversed. The reversed splitter threshold THAR may be calculated as the minimum possible received power P for any possible cable type and any possible loop length, assuming that the splitter 34 is correctly connected.

Then a branch 105 of block 65 verifies whether at least two activation tones 55*a*, 55*b*, 55*c* have a power level P below their corresponding reverse threshold THAR. If so (Y), a reversed splitter is detected in a step 107.

Otherwise (N), a branch 109 is executed that determines whether there is an inverted splitter 34 depending on a difference $\Delta$ of the received power level between successive activation tones. In the shown embodiment, the minimum difference in received power between activation tones 9 and 17 in case of the reversed splitter 34 may be determined. In FIG. 11 this minimum difference is labeled with $\Delta_R$. In addition, the maximum difference in received power between the same activation tones having the indices 9 and 17 may be calculated, assuming that the splitter 34 is correctly connected. In FIG. 11, this maximum difference is labeled with $\Delta_N$.

In an embodiment, the minimum difference $\Delta_R$ is used as a first signal power difference threshold $\Delta_R$ and the maximum difference $\Delta_N$ is used as a second signal power difference threshold $\Delta_N$. A measured actual difference $\Delta$ in received power P may be compared with these two signal power difference thresholds $\Delta_R$, $\Delta_N$. This comparison allows to detect at what rate the signal power decreases with the frequency of the activation tones. If the measured difference $\Delta$ is smaller than $\Delta_N$, a correctly connected splitter 34 (or absence of splitter) may be assumed. If the measured difference $\Delta$ is greater than $\Delta_R$, a reversed splitter 34 may be detected. In an embodiment, this test is performed accordingly for the sequence tones 17 and 25 in addition to the tests related to the tones 9 and 17 or instead of the tests related to the tones 9 and 17.

If at least one tone has a received signal power level P above the corresponding normal threshold THAN then, in an embodiment, a correctly connected splitter 34 (or absence of splitter) may be assumed. However, if no activation tone is received with a signal power level above the corresponding normal threshold THAN, then the above described tests based on comparing the measured difference $\Delta$ of subsequent activation tones with the thresholds $\Delta_R$, $\Delta_N$ calculated for the specific two activation tones may be performed.

Consequently, branch 109—combining the test based on the thresholds THAR, THAN and the test based on the signal power difference thresholds $\Delta_R \Delta_N$—checks whether no activation tone has a signal power level P above its corresponding normal threshold THAN and if the measured threshold $\Delta$ is above the threshold $\Delta_R$, i.e. $\Delta_R < \Delta$, for each pair (9, 17), (17, 25) of subsequent activation tones. If both conditions checked in branch 109 are true (Y), then step 107 is performed in order to detect the reversed splitter 34. Otherwise (N), a further branch 110 may check if the measured signal power difference $\Delta$ is below the threshold $\Delta_N$. If it is the case (Y), a correctly installed splitter 34 (or absence of splitter) is detected in a step 111. Otherwise (N), a step 112 is executed in order to indicate that one cannot conclude. In another embodiment, branch 109 considers only one pair (9, 17) or (17, 25) of subsequent activation tones.

Figure 12:
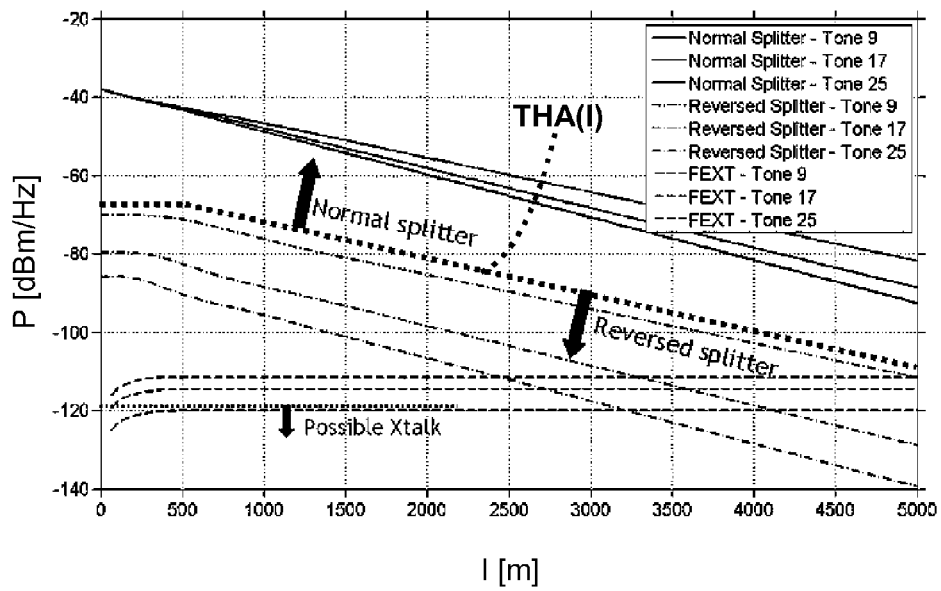
FIG. 12 shows the diagram of FIG. 11, with a threshold depending on the length of the telecommunication line.

If branch 101 determines that the loop length l is available or can be determined (Y), then a step 112 determines the loop length e.g. in the same way as step 89 and a step 113 computes a single loop length dependent threshold THA(l) for each activation tone 55*a*, 55*b*, 55*c* from the results of the simulation carried out in step 93. In FIG. 12, this loop length dependent threshold THA(l) is depicted for the activation tone 55*a* having index 9. In an embodiment, the threshold THA(l) is computed for every activation tone 55*a*, 55*b*, 55*c*, so that multiple values of the threshold THA(l) are obtained for the different activation tones.

In an embodiment, the threshold THA(l) may be chosen, separately for each loop length, at a level corresponding to the maximum possible received power P for any cable type at that loop length l, assuming that the splitter is reversed.

Then a branch 115 is performed that checks whether at least two activation tones 55*a*, 55*b*, 55*c* have a received signal power level P below their corresponding loop length depending threshold THA(l). If so (Y) then step 107 is executed in order to detect the inverted splitter 34. Otherwise (N) step 111 is executed in order to detect a correctly connected splitter 34 (or absence of splitter). After step 107 or step 111, the block 65 is terminated.

Using the loop length depending threshold THA(l) allows for accurate detection of a reversed splitter 34 even if the activation tones 55*a*, 55*b*, 55*c* are not sent at full power by the modem 19. If step 93 performs the simulations assuming the maximum allowed power by the DSL standards, i.e. −38 dBm/Hz, and the modem 19 transmits the activation tones with a lower transmission power then the thresholds THAR, THAN, THAR(l) would probably be too high. However, when using a loop length dependent threshold THA(l) there is a margin of about 20 dB between the threshold THA(l) and the curve representing the received power at full transmission power (the continuous curves). Hence, even if the modem 19 reduces its transmission power, the detection of the reversed splitter 34 will still be accurate. In case the received power level is below the crosstalk threshold THXT, the verification of the dependence of received power versus frequency, i.e. activation tone index, must be carried out in order to verify that the received tones do not come from the further telecommunication line 36.

To sum up, the embodiments described herein allow to detect whether the splitter 34 of the CPE 21 is correctly connected or reversed. The method 57 compares a value that depends on an attenuation of the telecommunication line 13 with at least one threshold. In case that information about the length of the telecommunication line 13 (loop length) is available, then a threshold that depends on the loop length may be calculated and compared with the value depending on the attenuation. Otherwise, fixed thresholds may be calculated. When using fixed thresholds, two thresholds may be used in order to identify cases where a reliable determination on whether or not the splitter 34 is connected correctly is not possible.

Depending on whether the modem 19 and the access node 17 are synchronized with each other, the value depending on the attenuation of the line 13 may be the downstream and/or upstream loop attenuation $A_{SS}$, $A_{US}$ measured when the modem 19 and the access node 17 are synchronized with each other or a received signal power level P at the access node 17 when the modem 19 and the access node 17 are not synchronized with each other. This method 57 may be executed on the network elements 17, 19 connected to the line 13 or the monitoring station 39 that can communicate with these network elements 17, 19 over the interconnection network 41 using a suitable communication protocol. As a consequence, the method 57 may be executed e.g. by a network operator without the need of direct access to the CPE 21. Thus, a reversed splitter 34, which is usually caused by a mistake of the customer when installing the modem 19 or the splitter 34, may be easily and cost efficiently diagnosed.

The invention claimed is:

1. A method for testing customer premises equipment comprising a DSL modem coupled with a telecommunication line, the method comprising:
    determining, using a monitoring device, at least one value that depends on an attenuation of a signal transmitted over the telecommunication line to the DSL modem or received over the telecommunication line from the DSL modem;
    detecting, depending on the at least one value, that the DSL modem is coupled with the telecommunication line via a DSL splitter in such a way that the DSL modem is connected to a different connector of the DSL splitter than a modem connector of the DSL splitter, in order to determine which modem connector is intended for being connected with the DSL modem;
    determining, using the monitoring device, a loop length value of the telecommunication line; and
    determining, using the monitoring device, at least two thresholds depending on the loop length value, the detecting being based on comparing the at least two thresholds with the value.

2. A method according to claim 1, wherein the method comprises concluding that the DSL modem is connected correctly to the line, concluding that the DSL modem connected to the different connector of the DSL splitter, or concluding that a reliable decision on whether the DSL modem is connected correctly.

3. A method according to claim 2, wherein the concluding depends on comparing the value with a first threshold and a second threshold of the at least two thresholds.

4. A method according to claim 1, wherein the at least one value corresponds to a loop attenuation of the telecommunication line.

5. A method for testing customer premises equipment comprising a DSL modem coupled with a telecommunication line, the method comprising:
    determining, using a monitoring device, at least one value that depends on an attenuation of a signal transmitted over the telecommunication line to the DSL modem or received over the telecommunication line from the DSL modem; and
    detecting, depending on the at least one value, that the DSL modem is coupled with the telecommunication line via a DSL splitter in such a way that the DSL modem is connected to a different connector of the DSL splitter than a modem connector of the DSL splitter, in order to determine which modem connector is intended for being connected with the DSL modem;
    determining, using the monitoring device, a loop length value of the telecommunication line; and
    determining, using the monitoring device, at least two thresholds depending on the loop length value, the detecting being based on comparing the at least two thresholds with the value,
    wherein the at least one value corresponds to a received signal power of a signal including at least one activation tone, the at least one activation tone being sent by the DSL modem over the telecommunication line.

6. The method according to claim 5, further comprising determining the at least one value for at least two different frequencies of the signal.

7. The method according to claim 5, further comprising testing whether a rate at which the received signal power decreases with the frequency of the signal is higher than a predefined rate threshold of the at least two thresholds, and concluding that the DSL modem is connected to the further connector when the testing shows that the rate is higher than the rate threshold.

8. The method according to claim 5, further comprising testing whether the received signal power increases with the frequency of the signal based on the comparison of the at least one value with the at least two thresholds, and concluding that the signal is a result of crosstalk from a further telecommunication line when the testing shows that the received signal power increases with the frequency.

9. The method according to claim 5, further comprising determining whether the DSL modem is synchronised with an access node, and wherein the concluding on whether the DSL modem is connected to the modem connector of the DSL splitter is based on the received signal power of the activation tone when the modem is not synchronized and wherein said concluding is based on the loop attenuation when the modem is synchronized.

10. The method according to claim 9, wherein the access node is a DSLAM.

11. A device for testing subscriber premises equipment, the subscriber premises equipment comprising a DSL modem coupled with a telecommunication line, the device comprising a processor configured for:
    determining at least one value that depends on an attenuation of a signal transmitted over the telecommunication line to the DSL modem or received over the telecommunication line from the DSL modem;
    detecting, depending on the at least on value, that the DSL modem is coupled with the telecommunication line via a DSL splitter in such a way that the DSL modem is connected to a different connector of the DSL splitter than a modem connector of the DSL splitter, in order to determine which modem connector is intended for being connected with the DSL modem;
    determining a loop length value of the telecommunication line; and
    determining at least two thresholds depending on the loop length value, wherein the detecting being based on comparing the at least two thresholds with the at least one value.

12. A monitoring node comprising a device according to claim 11, and the monitoring node further comprising a communication interface for connecting the monitoring node to a network including the subscriber premises equipment, and the subscriber premises equipment comprising the DSL modem.

13. A device for testing subscriber premises equipment, the subscriber premises equipment comprising a DSL modem coupled with a telecommunication line, the device comprising a processor configured for:
    determining at least one value that depends on an attenuation of a signal transmitted over the telecommunication line to the DSL modem or received over the telecommunication line from the DSL modem;

detecting, depending on the at least one value, that the DSL modem is coupled with the telecommunication line via a DSL splitter in such a way that the DSL modem is connected to a different connector of the DSL splitter than a modem connector of the DSL splitter, in order to determine which modem connector is intended for being connected with the DSL modem;

determining a loop length value of the telecommunication line; and determining at least two thresholds depending on the loop length value, wherein the detecting being based on comparing the at least two thresholds with the at least one value, wherein the at least one value corresponds to a received signal power of a signal including at least one activation tone, the at least one activation tone being sent by the DSL modem over the telecommunication line.

* * * * *